(12) United States Patent
Chesson

(10) Patent No.: US 6,795,407 B2
(45) Date of Patent: Sep. 21, 2004

(54) METHODS FOR CONTROLLING SHARED ACCESS TO WIRELESS TRANSMISSION SYSTEMS AND INCREASING THROUGHPUT OF THE SAME

(75) Inventor: Gregory Lawrence Chesson, Palo Alto, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 342 days.

(21) Appl. No.: 09/839,647

(22) Filed: Apr. 20, 2001

(65) Prior Publication Data

US 2002/0045428 A1 Apr. 18, 2002

Related U.S. Application Data

(60) Provisional application No. 60/199,050, filed on Apr. 22, 2000.

(51) Int. Cl.$^7$ .................................................. H04B 1/10
(52) U.S. Cl. ....................................... 370/311; 370/347
(58) Field of Search ................................. 370/310, 328, 370/329, 330, 331, 332, 333, 334, 335, 336, 337, 338, 447, 311, 341, 465

(56) References Cited

U.S. PATENT DOCUMENTS

| | | | |
|---|---|---|---|
| 4,661,952 A | | 4/1987 | von Sichart et al. |
| 4,866,710 A | * | 9/1989 | Schaeffer .................... 370/330 |
| 5,142,690 A | * | 8/1992 | McMullan et al. .......... 725/124 |
| 5,311,550 A | * | 5/1994 | Fouche et al. ............... 375/260 |
| 5,357,513 A | * | 10/1994 | Kay et al. .................... 370/332 |
| 5,384,777 A | * | 1/1995 | Ahmadi et al. .............. 370/337 |
| 5,422,887 A | * | 6/1995 | Diepstraten et al. ......... 370/448 |
| 5,594,731 A | * | 1/1997 | Reissner ...................... 370/338 |
| 5,657,317 A | * | 8/1997 | Mahany et al. .............. 370/338 |
| 5,768,683 A | * | 6/1998 | Mulford ...................... 455/11.1 |
| 5,870,523 A | * | 2/1999 | Kikuchi et al. ............... 386/95 |
| 5,912,921 A | | 6/1999 | Warren et al. |
| 5,987,011 A | * | 11/1999 | Toh ............................. 370/331 |
| 6,510,133 B1 | | 1/2003 | Uesugi |
| 6,545,997 B1 | | 4/2003 | Bohnke et al. |
| 6,587,453 B1 | | 7/2003 | Romans et al. |
| 2003/0123414 A1 | | 7/2003 | Tong et al. |

FOREIGN PATENT DOCUMENTS

| | | |
|---|---|---|
| WO | WO 00 51293 A | 8/2000 |
| WO | PCT/US 01/12920 | 4/2001 |

OTHER PUBLICATIONS

IEEE 802.11 1997 "Wireless Medium Access Control (MAC) and Physical (PHY) Specifications".*

"Wireless LAN Medium Access Control and Physical Layer Specifications" IEEE 802.11 Standard, Chapter 9.1 MAC, pp. 71–72, XP–002179388, Chapter 9.3 PCF, pp. 87–89, Figure 60, Chapter 11.2 Power Management, pp. 128–130, Jun. 26, 1997.

Adachi, et al. "A study on Channel Usage in a Cellular Ad–Hoc United Communication System for Operational Robots" XP–000790184, IEICE Trans Commun. vol. E81–B, No. 7., pp. 1500–1506, Jul. 1998.

* cited by examiner

Primary Examiner—Huy D. Vu
Assistant Examiner—Daniel Ryman
(74) Attorney, Agent, or Firm—Rosenberg, Klein & Lee

(57) ABSTRACT

A wireless communication system implements a calibration mode by which individual nodes in the system can determine which other nodes in the system are physically close to them and therefore can be reached with less than full transmitting power. Nodes which can communicate with one another via low power can form a low power constellation (a subset of the complete network) whose nodes can communicate directly with one another using this low power arrangement. The direct communication mode may additionally be used by itself. In another mode, the nodes in the system can communicate amongst themselves via bridges—other, non-access point nodes—to lessen the load on the access point or to accommodate environmental or other conditions. Various ones of these modes may be combined into a predetermined cycle of communication modes to help the physical layer accommodate various types of data handled by the network using beacons or another coordinating technique. Overhead in the form of packet retransmission may be reduced by interpolating to recover lost packets rather than retransmitting them.

31 Claims, 1 Drawing Sheet

METHODS FOR CONTROLLING SHARED ACCESS TO WIRELESS TRANSMISSION SYSTEMS AND INCREASING THROUGHPUT OF THE SAME

This application claims priority on U.S. Provisional Application No. 60/199,050 filed Apr. 22, 2000.

BACKGROUND OF THE INVENTION

1. Field of the Invention

The present invention is directed to communication systems and networks and is particularly directed toward methods for controlling shared access to wireless transmission systems.

2. Background of Related Art

Network systems and network traffic loads have evolved and stratified in several important dimensions. The systems have adapted to a great range of distances—e.g., from personal area networks (PANs) to local area (LANs), metro area (MANs) and wide area (WANs). The bandwidth properties of the physical media have also grown to span a wide range of possibilities—there are significant transmission systems for kilobits, megabits, gigabits, and terabits. Traffic loads have grown from simple telecommunication and file transfer applications to include a wide variety of traffic types such as:

- bursty asynchronous small data (e.g., 1–128 byte messages);
- bursty asynchronous file/page data (e.g., 1–16 KB messages);
- bursty asynchronous bulk data (e.g., 1 MB and beyond);
- streaming (isochronous) small data, file data and bulk data;
- streaming (variable bit rate);
- multicast or broadcast data;
- guaranteed rate and/or guaranteed jitter; and
- prioritized traffic.

It is important to consider how diverse traffic types can coexist on a given network or mix of networks. The effectiveness of different methods for carrying different kinds of traffic will vary with the geographic range of the network— i.e., PAN, LAN, MAN, WAN—with the available bandwidth on the medium, with the control scheme of the network, and with the mix of the traffic types loading the network.

Many networking systems, e.g., Ethernet, were invented prior to the existence of a wide range of traffic types. Ethernet pioneered packet transmission over a contention medium and is not optimized for isochronous traffic. Other networks have been designed for different missions. Examples include Fibre Channel which was originally developed as an interconnect method for disk storage, and ATM which was originally designed for telephony and media traffic. Wireless networks, while sharing the wireless medium, have been developed with great diversity including both cell-based TDMA control (HiperLan) and Ethernet-like contention-based methods (IEEE 802.11).

Contemporary wireless communication systems specify one or more communication "channels", or frequency bands, for stations to transmit and receive encoded data. The channels are used in one of two ways: a station transmits data to a control unit, usually called an access point (AP), which forwards the data to another station (forwarding mode), or a station may transmit data directly to a destination station without passing through an access point (direct mode).

Forwarding mode provides an advantage in that stations that may not be able to transmit directly to each other because of range limitations or other problems can still communicate by forwarding through the access point. One disadvantage of this method is that data must traverse the channel twice, thus reducing the total available bandwidth by half.

The access point in wireless networking supplies control methods and protocols that coordinate the various transfers between wireless stations. It is common practice to define an ad hoc network as a set of wireless stations without a dedicated access point. In this configuration it is assumed that some, if not all, of the stations are capable of serving as access point and that a selection procedure exists whereby one of the stations will provide the necessary control functions.

The IEEE 802.11a standard specifies multiple channels each consisting of multiple carrier frequencies with several possible modulation schemes, e.g., OFDM, defined for the channels. In typical practice a channel is operated as a monolithic unit where a transmitter always sends on the complete set of carriers defined for a channel and a receiver always receives from the complete set of carriers. New technologies have been invented whereby a transmitter can use a subset of the carriers while other transmitters simultaneously utilize a different non-conflicting set of carriers from the same channel. This technology introduces a new operational mode for the channel which can be called "overlaid mode". Thus, multiple transmitters can be using a channel in overlaid mode whereas in the normal non-overlaid mode only a single transmitter can be active.

With the addition of an overlaid mode, conventional channels that would otherwise have only two modes (forwarding or direct) could have at least four modes: forwarding, forwarding+overlaid (where the transmitter communicates with the receiver via the access point over only a subset of the full carrier set), direct, and direct+overlaid (where the transmitter communicates with the receive directly over only a subset of the full carrier set).

Wireless networks and particularly networks with multi-carrier channels have certain constraints:

- radios used in wireless networking are not able to simultaneously send and receive (because the transmitter would overwhelm a local receiver); and
- power received on different carriers in a multi-carrier system must be approximately equal across all the carriers; otherwise signals on stronger carriers will overwhelm weaker carriers in systems where a common amplifier with automatic gain control processes all of the carriers.

There are a number of factors such as uniform timing, frequency stability, multi-path and noise phenomena that are preferably considered as well in creating a viable overlaid transmission system. The issue of power control in the overlaid mode is another of these. There exist both open-loop and closed-loop power control methods that help a single transmitter adjust its power output, and help a single receiver adjust its receiver gain, when a particular transmitter/receiver pair is active. These procedures are not applicable when either

- multiple transmitters are sending to the same receiver at the same time; or
- multiple transmitters are engaged in direct transfers in an overlaid mode at the same time.

A wireless transmission system experiences much higher bit error rates, or packet error rates, than a comparable wired transmission system. In order to make wireless systems robust the physical layer design of wireless systems typically incorporates some or all of the following adaptive techniques:

means to select a more robust, and hence lower data rate, encoding scheme when the channel is noisy or a less redundant and a higher data rate encoding scheme when the channel is clear;

means to quickly acknowledge the correct reception of a packet—and thus to quickly retransmit the packet if necessary—in order to reduce the packet error rate; and means to change frequencies or channels in a dynamic manner in order to move from a frequency band that is noisy or affected by multi-path effects to a different frequency band that is better.

These techniques for improving channel robustness must be reconsidered, modified, or replaced in the context of overlaid communication. The frequency assignment problem is more complicated because multiple carriers must be assigned to multiple transmitters instead of all carriers being assigned to a single transmitter. The traditional method of acknowledging a transmitted packet must be reconsidered in overlaid mode because there are multiple simultaneous packets to acknowledge rather than a single packet. Mobile stations may need to change carrier frequencies, but it will be difficult to determine which frequencies are available and which frequencies might offer some improvement.

Access methods for wireless channels fall into three general categories: contention methods, polling methods, and TDMA methods. Contention systems such as IEEE 802.11 use heuristics—e.g., random backoff, listen-before-talk, and mandated interframe delay periods—to avoid (but not completely eliminate) collisions on the wireless medium. IEEE 802.11 also employs a beacon message which can be asserted by the access point and which allows the access point to individually poll selected stations for sending or receiving data. The duration of the polling period is controlled by a parameter set by the access point and contained within the beacon message. Slotted systems, e.g., TDMA, assign timeslots to individual transmitters to eliminate collision and assign predictable amounts of bandwidth. The contention systems are well-suited to asynchronous bursty traffic. These systems work particularly well when the burst sizes are comparable to the natural packet size of the medium, or small multiples of the natural packet size. Slotted systems are well-suited to isochronous applications that have a need for continuous channel bandwidth, although they may have extra overhead in comparison to contention systems when carrying asynchronous bursty traffic.

Methods have been devised to map different kinds of traffic to a particular medium; i.e., to give slotted media some of the attributes of contention media and vice versa. For example, Fibre Channel classes and ATM adaptation layers or convergence layers specify procedures for mapping different kinds of traffic onto underlying media. In all cases these are mappings onto an underlying medium—packet-based in the case of Fibre Channel or cell-based in the case of ATM. Mappings and convergence layers are separate and distinct from the underlying physical medium, and the distinction is equally appropriate for wireless network which have been designed to operate either as contention networks or slotted or TDMA networks.

SUMMARY OF THE INVENTION

In view of the above problems of the art, it is an object of the present invention to provide a wireless transmission system capable of many operational modes, e.g., forwarding or direct; overlaid or non-overlaid; contention, polled or slotted; acknowledged or non-acknowledged.

It is another object of the present invention to provide a method for operating a physical channel in several modes.

It is a further object of the present invention to provide a method for calibrating transmit power levels in an overlaid multi-carrier system with changing conditions or mobile stations.

It is a further object of the present invention to provide a method for comparing signal quality of different frequencies in order to select carriers for overlay operation in a multi-carrier system.

It is yet another object of the present invention to provide a method for supporting direct station-to-station communication in a multi-carrier system with overlaid capability.

It is a still further object to provide a method for improving the efficiency of the medium regarding control messages such as acknowledgements It is another object of the present invention to provide a method for adjusting power levels and frequency assignments in an overlaid or non-overlaid system for mobile stations or for stations that experience changes in their local environment.

The above objects are met according to a first aspect of the present invention by providing techniques for controlling shared access to wireless communication systems. A wireless communication system implements a calibration mode by which individual nodes in the system can determine which other nodes in the system are physically close to them and therefore can be reached with less than full transmitting power. It may also implement a calibration mode by which the signal quality at different carrier frequencies can be determined for pairs of stations. Nodes which can communicate with one another via low power can form a low power constellation (a subset of the complete network) whose nodes can communicate directly with one another using this low power arrangement. The direct communication mode may additionally be used by itself. In another mode, the nodes in the system can communicate amongst themselves via bridges—other, non-access point nodes—to lessen the load on the access point or to accommodate environmental or other conditions. Various ones of these modes may be combined into a predetermined cycle of communication modes to help the physical layer accommodate various types of data handled by the network using beacons or another coordinating technique. Overhead in the form of packet retransmission may be reduced by interpolating to recover lost packets rather than retransmitting them.

BRIEF DESCRIPTION OF THE DRAWING

These and other objects, features, and advantages of the present invention are better understood by reading the following detailed description of the preferred embodiments, taken in conjunction with the accompanying drawings, in which.

DETAILED DESCRIPTION OF THE PRESENTLY PREFERRED EXEMPLARY EMBODIMENTS

Figure 1:
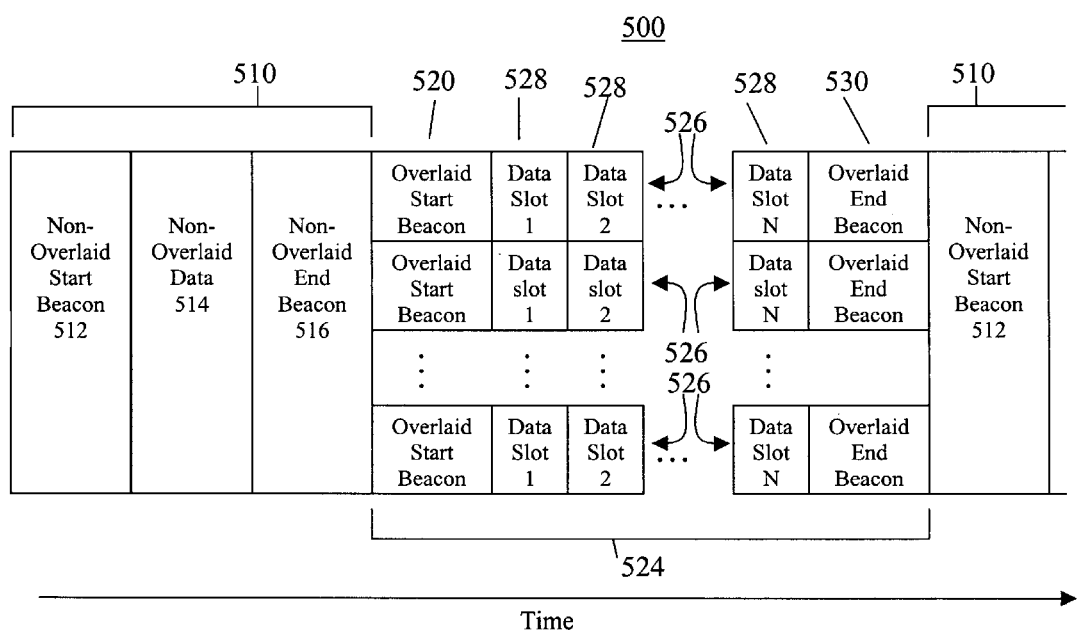
FIG. 1 is a timing chart of a frame protocol according to a preferred embodiment of the present invention.

The overlaid communication system described above may be used as part of an integrated overlaid/non-overlaid "super frame" communication system. FIG. 1 charts a communication segment 500 in this embodiment which is preferably implemented using a microprocessor or similar controller in each communicating unit and begins with a non-overlaid communication period 510 commencing with a non-overlaid communication start beacon 512. This is an information segment signaled by a coordinator node (a base station, a node that has been elected or volunteered to perform system coordination functions, or a number of nodes among which the coordination function is handed in an ad hoc network where there is no established infrastructure such as an established base station) over all available carriers; alternatively, for robustness and distributed ad hoc operation the duty of sending the non-overlaid start beacon 512 may be shared amongst the nodes. In this case there would not be one fixed permanent coordinator, but each of the nodes would act as coordinator on a temporary basis.

Preferably, the segment 512 includes a header pattern which allows all nodes to easily recognize that it is a non-overlaid communication start beacon 512, as well as the length of time non-overlaid communication will be available. The start beacon 512 may additionally carry other information; for example, it may specify when the beginning and end of various communication periods will occur as well as their lengths. The inclusion of such information allows all nodes to stay in synch with the network, even if they cannot interpret the messages during the overlaid communication period 524, or during the non-overlaid communication period 510. Also, since the non-overlaid communication start beacon 512 is broadcast over all available carriers all nodes will receive it, though nodes that can receive only a subset of carriers may not be able to interpret it. This is particularly the case where when the signal is sent on all carriers it is coded across all the carriers, so that if a node cannot receive all carriers it cannot understand the signal. This is characteristic of systems that are backwards-compatible with nodes implementing protocols such as HiperlanII or IEEE 802.11.

The next communication segment in the non-overlaid communication period 510 is the non-overlaid data communication period 514 which supports communication between nodes that can use all carrier frequencies within the multi-carrier communications channel. Since all available carriers are used by a single node during this period, the non-overlaid data communication period 514 cannot support overlaid communication. The non-overlaid data communication period 514 is useful for supporting nodes that are not able to use a subset of the available carriers. Additionally, since only one node is transmitting, the non-overlaid data communication period 514 can be used to support peer-to-peer communication without violating the need for time alignment, power control, and half duplex operation mode. Nodes that can receive only a subset of carriers will neither transmit nor receive during the non-overlaid data communication period 514–based on the overlaid beacons which these nodes can understand, they will know when to transmit and will not transmit outside of the overlaid period.

A non-overlaid communication end beacon 516 complements the start beacon 512 and follows the non-overlaid data communication period 514. Like its counterpart, the end beacon 516 is an information segment signaled by a coordinator node over all available carriers. Preferably, the beacon 516 includes a header pattern which allows all nodes to easily recognize that it is a non-overlaid communication end beacon 516, as well as the length of time before non-overlaid communication will again be available. The end beacon 516 may additionally carry other information as described above in connection with the non-overlaid start beacon 512. Since the non-overlaid communication end beacon 516 is broadcast over all available carriers all nodes will receive it, though nodes that can receive only a subset of carriers will not be able to interpret it as described in connection with the start beacon.

After the non-overlaid communication end beacon 516 comes the overlaid communication period 524. Its beginning is signaled by the overlaid communication start beacon 520 which parallels the non-overlaid communication start beacon 512 in its purpose. The overlaid communication start beacon 520 is transmitted on all available carriers so that even a node that can receive only one channel can recover the start beacon 520, and preferably contains a header which enables nodes to easily recognize it. The overlaid communication start beacon 520 preferably contains assignments of nodes to carrier frequencies as described above and, potentially, time slots for node shifting. The start beacon 520 also preferably specifies the length of the following overlaid data communication period 524, or alternatively the time at which the period 524 will end, as well as other information such as that described above in connection with the non-overlaid communication period 510. Nodes that are not able to handle overlaid communications may not understand this beacon. This is because current systems code the information across all carriers in a particular way. In this case, information is preferably coded serially down each carrier individually.

As mentioned above, the overlaid data communication period 524 follows the overlaid data communication start beacon 520. It is here that the basic overlaid communication scheme may be implemented. That is, the overlaid data communication period 524 supports overlaid signaling in which more than one node is transmitting at the same time and nodes use fewer than all of the available carrier frequencies. These different carriers are shown in FIG. 1 as different rows 526 in the overlaid data communication period 524. During the overlaid data communication period 524, a given carrier 526 may be assigned to only one node for transmission. In the present embodiment, this means the node would occupy each data slot 528 for a particular carrier 526. Also, a particular carrier 526 might be shared in time between several nodes including the controller node. Methods for sharing in time while in overlaid communication mode will be described in greater detail below. Nodes that cannot handle overlaid communications would neither transmit nor receive during the overlaid data communication period 524.

The end of the overlaid data communication period 524 is signaled by an overlaid communication end beacon 530. As with its non-overlaid counterpart, this beacon 530 preferably includes an easily-recognizable header and indicates the time at which (or the delay before) the next overlaid communication period 524 begins. It might also carry information similar to that of the overlaid communication start beacon 520 described above. Like the non-overlaid communication end beacon 516, this beacon 530 is preferably transmitted on all available carriers to ensure that even nodes capable of accessing only a single channel will receive it. Nodes that do not know how to handle overlaid communications will not understand this beacon.

The overlaid communication start beacon 520 and overlaid communication end beacon 530 preferably contain nearly the same information described above in connection with their non-overlaid counterpart beacons 512 and 516; however, the overlaid beacons 520 and 530 may contain different information on each carrier frequency 526. Some information such as the time reference and when the overlaid communication period 524 begins and ends needs to be transmitted on each carrier 526; however, other information such as which time slot 528 is assigned to which node for a given carrier 526 is unique to each carrier 526. Information unique to a given node, e.g., sleep/wake information, only needs to be transmitted on one of the carriers 526 assigned to that node. Also, the beacons 520 and 530 may contain information about which carrier/time slot pairs are available for nodes to request service.

One further piece of information that the overlaid communication period beacons 520 and 530 need to carry is the assignment of nodes to frequency carriers 526. As shown in FIG. 1, after the overlaid communication period 524 ends, operation preferably continues with a new communication segment 500.

This super frame protocol may be readily adapted to work with existing industry standard protocols. For example, the IEEE 802.11 standard specifies a PCF beacon which specifies an amount of time during which nodes are to remain silent as long as they are not requested to transmit by a poll message. This beacon could be used as the overlaid communication start beacon 520. Nodes that do not understand transmissions during the overlaid communication period 524 would remain silent based on the time period specified in the PCF beacon. After the time period 524 is up, these nodes would be free to communicate in their standard non-overlaid mode during the non-overlaid communication period 510.

Further, the IEEE 802.11 standard defines a CF-End beacon. This beacon announces the end of the polling period. It is used if the polling is completed before the time reserved in the PCF beacon period expires. This beacon could serve as the overlaid communication end beacon 530 to indicate that the overlaid communication period 524 has ended, thereby allowing nodes to begin communicating in their traditional non-overlaid manner in the next non-overlaid communication period 510.

Similarly, the frame protocol 500 of this embodiment may be readily adapted to work with the existing HiperlanII industry standard protocol. In this protocol, communication during the non-overlaid period is done by time division multiple access (TDMA). Since the assignment of time slots for transmissions is controlled, it is easy in this communication system to reserve a period of time during which overlaid communication would be supported.

In a system such as IEEE 802.11 which has start-beacon and end-beacon signals and the system described above where the beacon defines a time period for slotted overlaid transmission, in preferred embodiments of the present invention the beacon concept is extended to denote special periods of time for:

carrier calibration;

slotted non-overlaid communication; and local constellation communication.

Preferred methods for specifying one of these time periods include the following:

encoding the type of period using bits that may be available in the beacon message itself;

encoding the type of period in a specially-designed message that immediately follows the beacon message;

encoding the type of period by using a non-existent station ID in an 802.11-defined beacon or polling message; and by prearrangement using either administrative control or a message exchange using ordinary means between access point and individual stations.

A method for defining and using the calibration period will first be described. A calibration period has three components: a control indication from the access point, a controlled transmission period by certain selected stations, and a period where stations communicate information back to the access point.

By definition, all stations collaborating with an access point must be able to exchange data messages with that access point. Also, every station will have a MAC address as well as a station ID which may be either assigned by administrative means to each station or assigned by the access point to each station, or determined by a distributed voting algorithm or other means. By one method or another each of N wireless stations will have an ID which will be, for purposes of this example only, a value between 1 and N. The number of single carriers available for overlaid transmission is C.

The access point begins a calibration period by broadcasting a message to all stations. This assigns a carrier frequency and power level to C, or fewer, stations. If the number of stations is greater than C, then multiple calibration periods can be initiated until all stations have been selected. One way of encoding the carrier assignment is to transmit a vector of length N where each of the N elements contains a carrier frequency value or identifier. However, it is more useful to transmit a vector with the number of elements equal to the number of available carriers. The number of carriers may be smaller than the number of stations in some instances, e.g., a large classroom or meeting room. Furthermore, this representation allows the AP to assign more than one carrier to a station.

In addition to assigning one or more carrier frequencies, the access point also assigns a power level for transmission. For a basic scheme the power levels could be represented as "low", "medium", and "high".

In addition to assigning carrier frequencies and power levels, the access point also specifies a time interval for calibration. After receiving a calibration beacon message, each station that has been selected to transmit on one or more carriers will do so. Each station transmits a short message including, but not limited to, the station ID and power level. Because stations cannot both send and receive, a sufficient number of calibration periods must be scheduled so that all stations that wish to operate in overlaid mode have an opportunity to transmit during a calibration period.

An access point can thus direct a set of stations to transmit on assigned carriers with an assigned power level for a certain period. This capability is the basis for creating a map or grid of stations that can "hear" one another at certain power levels at specified frequencies.

One preferred method for using the calibration period by direction from an AP or other designated controller is:

1. all nodes transmit at low power (on different carriers assigned by AP).
2. all stations (up to C per period) record which carriers they can decode. They also record the received power level (e.g., "low", "medium", "high").
3. all stations report results to AP either via a poll response or by transmitting in an assigned or implied slot following the calibration period.
4. process repeats with AP changing the set of nodes that transmit, their assigned carriers, and transmit power levels.
5. process converges to a map which could take the form shown in TABLE I.

TABLE I

| station ID | 1 | 2 | 3 |
|---|---|---|---|
| 1 | | low | high |
| 2 | low | | low |
| 3 | high | low | |

This shows that station pairs (1,2) and (2,3) can communicate at low power, and station pair (1,3) needs high power. Thus (1,3) cannot use overlays at the same time as the others because station 2 would be saturated by station 3.

A "brute force" process would involve testing all combinations of station, carrier frequencies, and power level. Clearly, reductions in testing complexity can be obtained by using observed receive power levels when transmitting a lower power settings to identify "nearby" stations that will overpower "remote" stations as calibration power levels are increased.

The end result of a sequence of calibration periods will be one or more matrices, or equivalent data structures, as described, with each preferably corresponding to a frequency assignment. The AP can keep this data for decision-making purposes, e.g., when making channel allocations for overlaid communications, and the AP may also transmit the matrix or selected subsections of the matrix to individual stations for their local use, or to prepare for the possibility that the AP function may migrate from one station to another.

Given a matrix or equivalent structure containing reachability information as described, an AP can make correct decisions about which stations may be allowed to participate in a overlaid timeslot. This information is necessary for both station-to-AP transmission in overlaid mode and station-to-station transmission when in overlaid mode.

Given a wireless transmission system with output power control and the ability to perform a power-frequency calibration procedure as described above, an additional mode of low-power operation may be defined. In this mode, a station operates at a power setting so low that only devices within a small volume, e.g., 3 or 4 feet, can communicate with one another. For example, a small computer system might be a wireless station communicating through an access point and could also have a wireless keyboard or mouse and other local peripherals such as telephone sets and personal organizers that communicate only via low-power transmissions. The computer system and its peripherals can be thought of as a "constellation" of devices. The method of using a beacon or control methods derived from beacons can be used to define a time period, or time slot, during which all the stations under control of an access point communicate at very low power levels with the wireless devices in their local constellation. This method provides more sharing of the wireless channel than would otherwise be possible.

Additional communication modes may be supported in the preferred embodiments. For example, nodes may communicate in a direct mode, i.e., station-to-station mode, instead of forwarding through an AP. This provides full channel bandwidth. Moreover, direct mode communication is also possible in overlay mode, i.e., with multiple simultaneous active transmitters using non-conflicting carriers and power levels that have been selected using data acquired during a power-frequency calibration procedure. Direct overlaid communication can thus increase channel efficiency and bandwidth by increasing the number of active transmitters and receivers.

An additional communication mode in which individual nodes act as bridges between two communicating peers without use of the AP can also be implemented. This mode extends the reach of an ad hoc network. Using this mode it is possible to have fewer cellular base stations in a cellular telephone system to cover the same area as long as there are a sufficient number of phones willing to acts as bridges between peer devices. On a smaller scale, one could cover a large office from a single AP that could reach all the wireless devices that were a few hops away by going through bridging stations instead of needing direct communications with every station.

Some embodiments of the present invention implement only one of these communication modes in a dedicated fashion; however, another embodiment implements two or more of the modes using the super frame arrangement generally described above in connection with FIG. 1 in which a communication cycle is composed of several segments separated by start and end beacons for that mode. For example, a system might operate according to a communication protocol establishing a communication cycle having a first period in which calibration communication is performed, followed by a second period of low power communication. This concept may be extended to include three or more modes within the communication cycle. Various ones of the modes may further be combined with one another to form hybrid modes which can be implemented as well. All of these may be used to render the physical communication medium in a form most appropriate for a particular type of data being carried thereon.

Full-carrier communication on a wireless channel normally requires an acknowledgement after every transmission, and that behavior can be duplicated in overlaid mode. Receivers can send acks using the same subset of overlaid carriers that were active when receiving messages. However, for short bursty or short isochronous traffic such as audio or voice traffic, the burst sizes may be very small and the amount of time on the channel for sending sound samples may be comparable to the amount of time on the channel for sending acks. In such cases it can be useful to eliminate the customary acknowledgement after transmission. With interleaved audio samples, a missing sample can be approximated by interpolation, thus eliminating the need for retransmitting the lost sample. Other types of data, e.g., analog sampled data having few or no high-frequency components, may also be used with this technique to avoid retransmission of packets.

There are other circumstances where it can be beneficial to eliminate traditional wireless packet acknowledgements. Certain applications, e.g., datagram applications utilizing the UDP protocol, may acknowledge and retransmit on error or implement error correction or data interpolation procedures as described for audio sampling. In cases where the packet sizes are small compared to the channel time needed for the normal wireless packet acknowledgement, the data transmission is not time critical, and the channel experiences sufficiently low noise and interference levels, then an improvement in channel efficiency can be provided by turning off the physical layer wireless acknowledgements and relying on slower-acting acknowledgement procedures built into higher-level protocol layers.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth in the appended claims.

I claim:

1. A method of establishing overlaid communications in a multi-carrier communication system between a plurality of wireless stations each capable of communicating on less than all carriers in the multi-carrier communication system comprising the steps of:

providing each of the plurality of wireless stations capable of performing overlaid communications in the multi-carrier communication system a message which includes an assigned carrier and a commonly assigned calibration transmit power level for transmission, allowing a period of time for each of the plurality of wireless stations to transmit at least one calibration message on the assigned carrier at the commonly assigned calibration power level;

transmitting from each of the plurality of wireless stations at least one calibration message on the assigned carrier at the commonly assigned calibration power level;

receiving from each of the plurality of wireless stations information indicating transmissions from other ones of the plurality of wireless stations that they received and the receive power level of each of these received transmissions; and using the received information to map which ones of the plurality of wireless stations can communicate with other ones of the plurality of wireless stations on assigned carriers, at a common transmit power level chosen from a plurality of available transmit power levels so that subsequent signals from some of the plurality of wireless stations arriving at substantially the same time at another of the wireless stations have a substantially similar receive power level at the another wireless station.

2. The method according to claim 1 wherein the step of transmitting transmits from each of the plurality of wireless stations a plurality of calibration messages.

3. The method according to claim 2 wherein each of the plurality of calibration messages for each of the plurality of wireless stations is transmitted at different power levels.

4. The method according to claim 3 wherein each of the plurality of power calibration messages for each of the plurality of wireless stations is transmitted at increasing power levels.

5. The method according to claim 3 wherein each of the plurality of power calibration messages for each of the plurality of wireless stations is transmitted at decreasing power levels.

6. The method according to claim 1 wherein the steps of providing and receiving occur at the another wireless station.

7. The method according to claim 6 wherein the another wireless station is an access point.

8. The method according to claim 1 wherein it is determined that a first wireless station cannot communicate with a second wireless station at one of the available power levels at the same time without preventing a third wireless station from communicating.

9. The method according to claim 8 wherein it is determined that the first wireless station cannot communicate with the second wireless station at one of the available power levels at the same time without saturating the third wireless station.

10. The method according to claim 1 wherein the message further specifies the period of time.

11. The method according to claim 1 wherein the message further specifies one of a plurality of calibration periods that exist during the period of time for each of the plurality of wireless stations to transmit at on the assigned carrier and at the assigned power level.

12. The method according to claim 11 wherein each of the plurality of wireless stations transmit during the period of time the calibration message containing therein an identifier of the transmitting wireless station and a transmit power level at which the calibration message is being transmitted.

13. The method according to claim 12 wherein the received calibration message from various ones of the transmitting wireless stations is collected at each receiving wireless station and used to obtain the information during the step of receiving.

14. The method according to claim 1 wherein the step of providing the message provides the carrier assignment using a vector having a number of elements equal to a number of available carriers.

15. The method according to claim 1 further including a transmission period during which the plurality of wireless stations communicate within constraints of the map.

16. The method according to claim 15 wherein during the transmission period, at least one pair of the plurality of wireless stations communicate such that an acknowledgement after a transmission is not used.

17. The method according to claim 1 wherein during the period of time, transmissions of different calibration messages on respectively different overlaid carriers can take place at the same time.

18. The method according to claim 1, wherein:

the multi-carrier communication system operates on a single frequency channel; and the multi-carrier communication system subdivides the single frequency channel to form all available carriers.

19. A method of establishing communications in a multi-carrier communication system between a plurality of wireless stations each capable of communicating on less than all carriers in the multi-carrier communication system comprising the steps of:

providing each of the plurality of wireless stations capable of performing communications in the multi-carrier communication system a message which includes a commonly assigned calibration power level for transmission, allowing a period of time for each of the plurality of wireless stations to transmit at least one calibration message at the commonly assigned calibration power level;

transmitting from each of the plurality of wireless stations at least one calibration message on the assigned carrier at the commonly assigned calibration power level;

receiving from each of the plurality of wireless stations information indicating transmissions from other ones of the plurality of wireless stations that they received and the receive power level of each of these received transmissions; and using the received information to map the receive power levels and associated transmitting and receiving wireless stations.

20. The method according to claim 19 wherein the multi-carrier communication system is a non-overlaid communication system.

21. The method according to claim 19, wherein:

the multi-carrier communication system operates on a single frequency channel; and the multi-carrier communication system subdivides the single frequency channel to form all available carriers.

22. A method of establishing overlaid communications in a multi-carrier communication system between a plurality of wireless stations each capable of communicating on less than all carriers in the multi-carrier communication system comprising the steps of:

provadiving each of the plurality of wireless stations capable of performing overlaid communications in the multi-carrier communication system a message which includes an assigned carrier and a commonly assigned calibration transmit power level for transmission, allowing a period of time for each of the plurality of wireless stations to transmit at least one calibration message on the assigned carrier at the commonly assigned calibration power level;

transmitting from each of the plurality of wireless stations at least one calibration message on the assigned carrier at the commonly assigned calibration power level;

receiving from each of the plurality of wireless stations information indicating transmissions from other ones of the plurality of wireless stations that they received and the receive power level of each of these received transmissions; and using the received information to map which ones of the plurality of wireless stations can communicate with other ones of the plurality of wireless stations on assigned carriers without substantially interfering with further ones of the plurality of wireless stations.

23. The method according to claim 22 wherein the steps of providing and receiving occur at the another wireless station.

24. The method according to claim 23 wherein the another wireless station is an access point.

25. The method according to claim 22 wherein it is determined that a first wireless station cannot communicate with a second wireless station at one of the available power levels at the same time without preventing a third wireless station from communicating.

26. The method according to claim 25 wherein it is determined that the first wireless station cannot communicate with the second wireless station at one of the available power levels at the same time without saturating the third wireless station.

27. The method according to claim 22 wherein each of the plurality of wireless stations transmit during the period of time the calibration message containing therein an identifier of the transmitting wireless station and a transmit power level at which the calibration message is being transmitted.

28. The method according to claim 22 wherein the received calibration message from various ones of the transmitting wireless stations is collected at each receiving wireless station and used to obtain the information during the step of receiving.

29. The method according to claim 22 further including a transmission period during which the plurality of wireless stations communicate within constraints of the map.

30. The method according to claim 29 wherein during the transmission period, at least one pair of the plurality of wireless stations communicate such that an acknowledgement after a transmission is not used.

31. The method according to claim 22, wherein:

the multi-carrier communication system operates on a single frequency channel; and the multi-carrier communication system subdivides the single frequency channel to form all available carriers.

* * * * *